Nov. 2, 1943.  R. E. CLIFTON  2,333,522
RELIEF VALVE
Filed Nov. 22, 1940
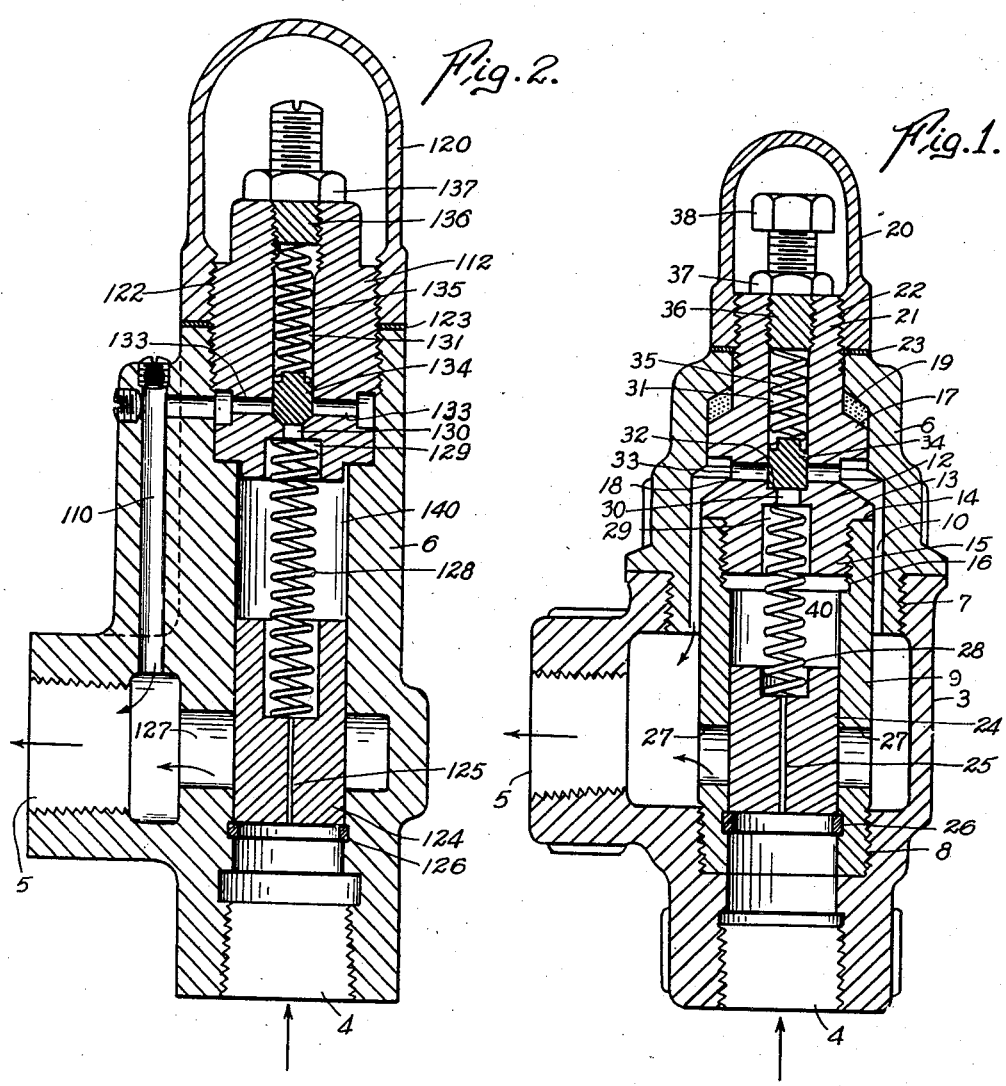
Robert E. Clifton
INVENTOR
BY Zugelter and Zugelter
ATTORNEYS Patented Nov. 2, 1943

2,333,522

UNITED STATES PATENT OFFICE 2,333,522

RELIEF VALVE

Robert E. Clifton, Blanchester, Ohio, assignor to The Fulflo Specialties Company, Inc., Blanchester, Ohio, a corporation of Ohio Application November 22, 1940, Serial No. 366,632

5 Claims. (Cl. 137—53)

This invention relates to improvements in a relief valve, or one which is designed for exhausting excessive pressure in a high pressure fluid system.

An object of the invention is to provide a relief valve which is so constructed as to be highly sensitive to over-pressures in a high pressure fluid system, and to operate under high pressure conditions without chatter, pounding or vibration.

Another object of the invention is to provide a valve including a balanced piston, and wherein the use of heavy and powerful springs is avoided, thereby resulting in a highly effective and serviceable product which will function for long periods of time without requiring attention or parts replacements.

Another object is to provide a valve structure of the character stated, wherein wear is minimized and the fluid controlled thereby is relieved without restriction under extremely slight variations in high pressure fluid systems, without the use of delicate and intricate parts.

A further object of the invention is the production of an improved valve of the character referred to above, at low manufacturing cost and with the use of materials capable of withstanding corrosion, wear, and distortion under high pressure and high temperature conditions.

These and other objects are attained by the means described herein and disclosed in the accompanyng drawing, in which:

Fig. 1 is a vertical cross-sectional view of one form of the improved relief valve of the invention.

Fig. 2 is a vertical cross-sectional view of a second form of the relief valve, which omits some of the features that characterize the Fig. 1 valve.

In the accompanying drawing, Fig. 1 illustrates one form of relief valve, wherein 3 indicates the valve body having an inlet port 4 and an outlet port 5, and 6 indicates a main bonnet threadedly connected to the body at 7. In the region of the inlet port 4, the body is interiorly threaded as at 8 to receive and support an upstanding cylinder 9 whose upper end extends into the bonnet chamber 10 leaving a space all around the cylinder for the passage of fluid, as will be hereinafter explained.

A cylinder bonnet 12 is provided with an annular flange 13 adapted to seat upon the circular end portion 14 of the cylinder, and a threaded plug 15 on the lower end of bonnet 12 engages the interior threads 16 of the cylinder to furnish a tight connection or joint between the cylinder bonnet and the cylinder itself. A packing gland 17, which is spaced from the flange 12 by a reduced neck portion 18 of the cylinder bonnet, bears against a packing ring 19 to seal the structure against fluid leakage from the top of the main bonnet 6. A cap 20 having a hollow domed end carries threads or other suitable means for attachment to the reduced upper end 21 of the cylinder bonnet. When furnished with threads such as 22, the cap may be pulled up tightly against a washer or gasket 23 to seal the upper end of the main bonnet 6.

The interior of cylinder 9 is smooth and straight between its threaded ends, and within it there is fitted a pressure piston 24 of cylindrical formation. The pressure piston is furnished with a constricted axial bore 25 through which fluid under pressure may pass for equalizing fluid pressure at the opposite ends of the piston. In its normal or closed position, the lower end of pressure piston 24 rests upon a ring 26 or other stop means located in the lower portion of the cylinder. Ring 26 serves merely as an abutment limiting descent of pressure piston 24. The piston, in its longitudinal reciprocatory movements, is adapted to cover and uncover one or more high pressure relief ports 27 formed in the lower section of the piston chamber of cylinder 9. The piston passes the ports 27 with a shearing action, and since the ports are circular like drill holes, any movements of the piston past them effects a gradual opening or closing of the ports and thereby avoids sudden surges of fluid under pressure as the piston operates. Accordingly, the action of the valve is smooth and will not induce hammering, pounding or other vibrations.

The pressure piston is lightly urged toward the depressed or closed position by means of a pressure piston spring 28, which bears at one end upon the top of the piston while its opposite end seats in a bore 29 formed within the plug 15 of the cylinder bonnet 12. At the base of bore 29, a secondary reduced inlet port 30 is provided, and above this port the bonnet is bored axially as at 31 to provide a secondary valve seat 32. The bore that forms the valve seat passes through a transverse bore 33 in the neck portion 18 of the cylinder bonnet, and thereby provides a miniature of the arrangement seen to exist at the high pressure relief ports 27. A secondary, or relief piston 34 is fitted in bore 31 for reciprocatory movement toward and from seat 32, and past the ports 33, in much the same manner that the larger pressure piston 24 covers and uncovers its ports 27. A relief piston spring 35 yieldingly holds piston 34 upon its seat 32, and by means of an adjusting screw 36 the seating force may be regulated. Screw 36 may threadedly engage the interiorly threaded upper end of cylinder bonnet 12, and be locked against accidental turning by means of a lock nut 37. The adjusting screw may be provided with a head 38 adapted to receive a wrench, and its size is limited so as to fit within the dome of cap 20.

In the operation of the valve above described, and assuming a high pressure of fluid existing in the inlet 4, it will be noted that the fluid will enter the constricted bore 25 of the pressure piston and will find its way into the chamber above said piston. As long as the fluid pressure is insufficient to unseat the relief or auxiliary valve or piston 34, fluid pressure will be equalized at opposite ends of the large piston 24 and the latter will remain static, being held lightly in the closed position by means of spring 28.

Should the fluid pressure at the inlet 4 gradually increase beyond that for which the valve is adjusted, the pressure building up in chamber 40, above piston 24, will unseat the relief piston 34 against the yielding force of its spring 35, and the pressure in chamber 40 accordingly will at once be reduced because of the fact that ports 30 and 33 are much larger than piston bore 25. This reduction of pressure above piston 24 will unbalance the piston and allow the greater pressure at the inlet to elevate the piston for uncovering the main ports 27. As soon as the pressure is relieved to the extent of permitting spring 35 to close the auxiliary relief valve 34, the pressure in chamber 40 will build up, by reason of passage of fluid through bore 25, until equalized pressures above and below the piston 24 result in a balanced condition of the piston, whereupon spring 28 will act to return said piston to the normal or cut-off position. The closing action of piston 24 will, of course, be gradual, and without shock.

From the foregoing, it should be understood that the inlet 4 and chamber 40 are for high fluid pressures, whereas ports 33 and 10 and the outlet port 5 are low pressure ports. The ports 27 of cylinder 9 serve as bypassing ports from high to low pressure areas.

The bore 25 of piston 24 being constricted in size, allows gradual increases in pressure to reach chamber 40 and first unseat the smaller piston 34 under normal conditions; however, the constriction is such that any very sudden increase in fluid pressure at inlet 4 will operate directly upon the lower end of piston 24 to unseat it quickly, to establish a full open condition of the large ports 27.

The combined cross-sectional area of cylinder 24 and ports 27, is made larger than the inside diameter of the pipes that connect to the inlet and outlet ports 4 and 5, so that there is no restriction whatsoever in the flow of fluid through the valve when unseated.

Attention is directed to the fact that the valve described is particularly useful for operating under high pressure conditions, and for that reason the piston 24 and cylinder 9 preferably are constructed of hardened steel or other wear-resisting metal which could not in practice be used in constructing the entire valve and its body. All pistons, cylinders, and other parts subjected to wear are replaceable.

In the simpler form of valve illustrated by Fig. 2, the basic principle of operation is the same as was explained in describing the valve of Fig. 1, the chief difference being that the Fig. 2 structure does not embody a hardened and replaceable cylinder such as 24. It will be understood, accordingly, that the foregoing description applies, wherefore the second illustration may be given the same reference characters preceeded by the prefix or digit "1," to connect the illustration with the foregoing description. For instance, the pistons, springs, and ports identified as 124, 134, 128, 135, 130, 133, 110 and 127, of Fig. 2 correspond to the same elements of Fig. 1 numbered 24, 34, 28, 35, 30, 33, 10 and 27. In the Fig. 2 modification, the low pressure chamber 110 is in the form of a bore provided in the body of the valve, whereas in Fig. 1 the corresponding chamber 10 is formed between the valve body and the cylinder 9. The device of Fig. 2, due to the absence of a separate cylinder for its piston 124, will not require a cylinder bonnet corresponding to bonnet 12 of Fig. 1. In all other respects, the structures are substantially identical.

It is to be understood that various modifications and changes in structural details may be made, within the scope of the appended claims, without departing from the spirit of the invention.

What is claimed is:

1. In a relief valve of the character described, the combination of a hollow valve body including a chamber and an inlet and an outlet port communicating with said chamber substantially at right angles, a hollow bonnet for the body closing the body chamber and arranged substantially axially of the inlet port, a separate replaceable hardened metal cylinder having one of its ends provided with a bypass port in communication with the outlet chamber of the valve body, means detachably fixing said one end of the cylinder to the valve body about the inlet port and in axial alignment with the inlet port, the opposite end of the cylinder extending into the hollow interior of the body bonnet, a cylinder bonnet closing said extending end of the cylinder, said cylinder bonnet being bored axially and transversely to provide a relief piston seat and a low pressure port therefor, the cylinder and a portion of its bonnet being annularly spaced from the interior of the body bonnet so as to provide for communication between the low pressure port and the valve body outlet port, a pressure piston reciprocable within the cylinder past the bypass port with a shearing action, and having a constricted bore passing through the piston from end to end for effecting fluid pressure equalization at opposite ends of the piston, means yieldingly urging the piston toward a position at which the bypass port is closed by the piston, a relief piston reciprocable toward and from the relief piston seat of the cylinder bonnet, for establishing temporary fluid communication between the low pressure port of the cylinder bonnet and the interior of the cylinder, and means for yieldingly maintaining the relief piston upon its seat in opposition to normal fluid pressure occurring between the pressure piston and the cylinder bonnet.

2. In a relief valve of the character described, the combination of a hollow valve body including a chamber and an inlet and an outlet port communicating with said chamber substantially at right angles, a hollow bonnet for the body closing the body chamber and arranged substantially axially of the inlet port, a separate hardened metal cylinder having one of its ends provided with a bypass port in communication with the outlet chamber of the valve body, means fixing said one end of the cylinder to the valve body in fluid communicating relationship to the inlet port and in axial alignment with the inlet port, the opposite end of the cylinder extending into the hollow interior of the body bonnet, a cylinder bonnet closing said extending end of the cylinder, said cylinder bonnet being bored axially and transversely to provide a relief piston seat and a low pressure port therefor, the cylinder and a portion of its bonnet being annularly spaced from the interior of the body bonnet so as to provide for communication between the low pressure port and the valve body outlet port, a pressure piston, reciprocable within the cylinder past the bypass port with a shearing action, and having a constricted bore passing through the piston from end to end for effecting fluid pressure equalization at opposite ends of the piston, means yieldingly urging the piston toward a position at which the bypass port is closed by the piston, a relief piston reciprocable toward and from the relief piston seat of the cylinder bonnet, for establishing temporary fluid communication between the low pressure port of the cylinder bonnet and the interior of the cylinder, means for yieldingly maintaining the relief piston upon its seat in opposition to normal fluid pressure occurring between the pressure piston and the cylinder bonnet, a threaded connection between the valve body and one end of the body bonnet forcing the body bonnet tightly against a gasket on the cylinder bonnet to effect a seal between the two bonnets, and an adjuster associated with the cylinder bonnet for varying the force of the yielding means that acts upon the relief piston.

3. In a relief valve of the character described, the combination of a hollow valve body including a chamber and an inlet and an outlet port communicating with said chamber, a hollow bonnet for the body closing the body chamber and arranged substantially axially of the inlet port, a separate replaceable metallic cylinder having one of its ends provided with a bypass port in communication with the outlet chamber of the valve body, means detachably fixing said one end of the cylinder to the valve body about the inlet port and in axial alignment therewith, the opposite end of the cylinder extending into the hollow interior of the body bonnet, a cylinder bonnet fixed to and substantially closing said extending end of the cylinder, said cylinder bonnet being elongated and closely fitted annularly within the hollow interior of the body bonnet to laterally support said extending end of the cylinder while effecting the substantial end closure of said body bonnet, a balanced pressure piston reciprocable within the cylinder to close and open the bypass port of the cylinder, and means in the cylinder bonnet including a relief piston adapted to relieve pressure at one end of the pressure piston and to thereby unbalance the latter for movement to port-opening position under the influence of fluid pressure acting upon the opposite end of the pressure piston.

4. In a relief valve of the character described, the combination of a hollow valve body including a chamber and an inlet and an outlet port communicating with said chamber, a hollow bonnet for the body closing the body chamber and arranged substantially axially of the inlet port, a separate replaceable metallic cylinder having one of its ends provided with a bypass port in communication with the outlet chamber of the valve body, means detachably fixing said one end of the cylinder to the valve body in fluid-tight relationship to and about the inlet port and in axial alignment with the inlet port, the opposite end of the cylinder extending into the hollow interior of the body bonnet, a cylinder bonnet rigidly fixed to and substantially closing said extending end of the cylinder, said cylinder bonnet being elongated and closely fitted annularly within the hollow interior of the body bonnet to laterally support said extending end of the cylinder while effecting the substantial end closure of said body bonnet, a balanced pressure piston reciprocable within the cylinder to close and open the bypass port of the cylinder, and means in the cylinder bonnet including a relief piston adapted to relieve pressure at one end of the pressure piston and to thereby unbalance the latter for movement to port-opening position under the influence of fluid pressure acting upon the opposite end of the pressure piston, and means operative when the relief piston is seated, for maintaining a balance of fluid pressure upon opposite ends of the pressure piston.

5. In a relief valve of the character described, the combination of a hollow valve body including a chamber and an inlet and an outlet port communicating with said chamber substantially at right angles, a hollow bonnet for the body closing the body chamber and arranged substantially axially of the inlet port, a separate replaceable hardened metal cylinder having one of its ends provided with a bypass port in communication with the outlet chamber of the valve body, means detachably fixing said one end of the cylinder to the valve body about the inlet port and in axial alignment with the inlet port, the opposite end of the cylinder extending into the hollow interior of the body bonnet, a top bonnet for the cylinder substantially closing said extending opposite end thereof, the cylinder bonnet having an axial bore and a concentric shoulder therein to provide a relief valve seat, said bore being relieved through a low pressure port to the outlet port of the body chamber at a point above the relief valve seat, the cylinder and bonnet at and below the low pressure port being annularly spaced from the interior of the body bonnet so as to provide for communication between said low pressure port and the valve body outlet port, a pressure piston reciprocable within the cylinder past the bypass port with a shearing action, and having a constricted bore passing through the piston from end to end for effecting fluid pressure equalization at opposite ends of the piston, means yieldingly urging the piston toward a position at which the bypass port is closed by the piston, a relief valve movable toward and from the relief valve seat of the cylinder bonnet, for establishing temporary fluid communication between the low pressure port of the cylinder bonnet and the interior of the cylinder, and means for yieldingly maintaining the relief valve upon its seat in opposition to normal fluid pressure occurring between the pressure piston and the cylinder bonnet.

ROBERT E. CLIFTON.